United States Patent
Katz et al.

(10) Patent No.: US 11,976,590 B2
(45) Date of Patent: May 7, 2024

(54) METHOD FOR PRODUCING POWER WITH STORED ENERGY

(71) Applicants: Ormat Systems Ltd., Yavne (IL); Ormat Technologies Inc., Reno, NV (US)

(72) Inventors: Eduard Katz, Haifa (IL); Omri Meshulam, Tel Aviv (IL); Anton Fiterman, Lehavim (IL); Nirit Grushko, Shedma (IL)

(73) Assignee: ORMAT TECHNOLOGIES INC., Reno, NV (US)

( * ) Notice: Subject to any disclaimer, the term of this patent is extended or adjusted under 35 U.S.C. 154(b) by 0 days.

(21) Appl. No.: 18/155,291

(22) Filed: Jan. 17, 2023

(65) Prior Publication Data
US 2023/0279807 A1 Sep. 7, 2023

Related U.S. Application Data

(63) Continuation-in-part of application No. 17/698,236, filed on Mar. 18, 2022, now Pat. No. 11,585,270.

(30) Foreign Application Priority Data

Mar. 1, 2022 (IL) .......................................... 291019

(51) Int. Cl.
*F02C 6/16* (2006.01)
*F02C 1/02* (2006.01)

(52) U.S. Cl.
CPC ................. *F02C 6/16* (2013.01); *F02C 1/02* (2013.01); *F05D 2220/76* (2013.01)

(58) Field of Classification Search
CPC ............................... F02C 6/16; F05D 2260/42
See application file for complete search history.

(56) References Cited

U.S. PATENT DOCUMENTS

| 9,121,417 B2 | 9/2015 | Guidati |
| 10,480,409 B2 | 11/2019 | Teixeira |
| 2011/0247323 A1* | 10/2011 | Kenway ................. B60L 50/30 60/415 |
| 2015/0184590 A1 | 7/2015 | Conlon |

(Continued)

FOREIGN PATENT DOCUMENTS

WO 2018033700 A1 2/2018

*Primary Examiner* — Shafiq Mian
(74) *Attorney, Agent, or Firm* — CANTOR COLBURN LLP

(57) ABSTRACT

An energy storage system has a pressure vessel that is exposed to ambient temperatures and that contains a working fluid which is condensable at ambient temperatures (CWF); a liquid reservoir in communication with one of the vessels and containing a liquid that is unvaporizable in the reservoir and in the vessel; and apparatus for delivering the liquid from the reservoir to the vessel. The CWF is compressible within the vessel upon direct contact with the liquid and is storable in a liquid state after being compressed to its saturation pressure. In a method, at least some of the liquid located in the vessel is propelled by the CWF towards a turbine to produce power. In one embodiment, a module has a first vessel having at least four ports, a second vessel at ambient temperatures, and a flow control component operatively connected to a corresponding conduit for selectively controlling fluid flow.

9 Claims, 11 Drawing Sheets

(56) References Cited

U.S. PATENT DOCUMENTS

| | | |
|---|---|---|
| 2017/0082123 A1 | 3/2017 | Momen et al. |
| 2017/0160019 A1 | 6/2017 | Pourima |
| 2019/0128185 A1* | 5/2019 | Lee .......................... F02C 1/04 |
| 2020/0165967 A1* | 5/2020 | Kerth ........................ F02C 6/14 |

* cited by examiner

METHOD FOR PRODUCING POWER WITH STORED ENERGY

CROSS-REFERENCE TO RELATED APPLICATIONS

This is a continuation-in-part of U.S. patent application Ser. No. 17/698,236 filed Mar. 18, 2022 and entitled "AN ENERGY STORAGE SYSTEM AND METHOD".

FIELD OF THE INVENTION

The present invention relates to the field of mechanical energy storage. More particularly, the invention relates to an energy storage system from which compressed gas is releasable for later use and a method therefor.

BACKGROUND OF THE INVENTION

Energy collected from various sustainable energy sources such as wind, solar and wave energy sources is known to be stored in the form of compressed gas. During periods of power demand, the compressed gas is discharged from the storage vessel and electrical power is able to be generated. Alternatively, the stored compressed gas can be utilized in different industrial applications.

Many compressed air energy storage (CAES) systems are known in the prior art. Compressed air has traditionally been stored in large and costly underground caverns or in underwater elastic balloons. Although CAES plants have a large power rating and storage capacity, they have some major drawbacks. Firstly, air has a significantly great heat of compression, suffering from a heat loss of approximately 85% when compressed. Less compressed air is able to be stored as its temperature increases. Secondly, the pressure in the cavern within which the compressed air is stored becomes slowly reduced as additional air is released, thereby negatively influencing the amount of electricity that is able to be produced by a turbine driven by the released compressed air.

Attempts have been made to reduce the heat of compression by charging and discharging air isothermally; however, the need of employing heat exchangers to facilitate the isothermal compression unnecessarily adds costs to a storage facility.

In other CAES systems, diabatic (D-CAES), adiabatic (A-CAES), and liquid (LAES) air energy storage means have been employed. The air temperature for these prior art systems significantly deviates from ambient temperature, and therefore these prior art systems also require the use of expensive heat exchangers and rotating equipment, i.e. compressors and gas turbines.

It is an object of the present invention to provide a compressed gas energy storage system with increased energy density relative to prior art systems.

It is an additional object of the present invention to provide a compressed gas energy storage system with increased system round trip efficiency relative to prior art systems.

It is an additional object of the present invention to provide a compressed gas energy storage system and method that have reduced capital and operating costs relative to the prior art.

Other objects and advantages of the invention will become apparent as the description proceeds.

SUMMARY OF THE INVENTION

A multiphase energy storage system comprises at least one pressure vessel that is exposed to ambient temperatures and that is adapted to contain a condensable working fluid (CWF) which is condensable at ambient temperatures; a liquid reservoir in fluid communication with one of said at least one pressure vessel and containing a liquid that is unvaporizable in said liquid reservoir and in said at least one pressure vessel; and means for delivering the unvaporizable liquid from said liquid reservoir to said one of said at least one pressure vessel, wherein the CWF is compressible within said one of said at least one pressure vessel upon direct contact with the unvaporizable liquid and is storable in a liquid state after being compressed to its saturation pressure and condensed.

It is understood that the "unvaporizable liquid" may be able to be vaporized when subjected to other conditions, Under the conditions imposed by the multiphase energy storage system, and particularly by the liquid reservoir and the at least one pressure vessel, the liquid, which may also be referred to as a "transfer liquid" is unvaporizable.

The CWF is preferably substantially isothermally compressible and expandable during direct contact with the unvaporizable liquid within said one of said at least one pressure vessel.

The CWF within said one of said at least one pressure vessel is continuously and additionally compressed while additional unvaporizable liquid is being introduced to said one of said at least one pressure vessel.

The energy storage system preferably further comprises at least one hydraulic turbine which is drivable by the unvaporizable liquid, wherein at least a portion of the unvaporizable liquid located within said one of said at least one pressure vessel is propellable towards said at least one hydraulic turbine by the compressed CWF. The unvaporizable liquid discharged from the at least one hydraulic turbine is receivable in the liquid reservoir.

In one aspect, the delivering means is at least one hydraulic pump for delivering the unvaporizable liquid from the liquid reservoir to said one of said at least one pressure vessel. The energy storage system may further comprise at least one additional hydraulic pump for delivering the unvaporizable liquid from said one of said at least one pressure vessel to the liquid reservoir.

In one embodiment, the at least one pressure vessel includes first and second pressure vessels in fluid communication with each other, wherein said second pressure vessel is exposed to ambient temperatures, the system further comprising a gas source in fluid communication with said first pressure vessel and containing the CWF, the CWF being feedable from said gas source to said first pressure vessel, wherein the CWF is compressible within, and transferable from, said first pressure vessel upon direct contact with the unvaporizable liquid and is storable in a liquid state within said second pressure vessel after being transferred thereto and being compressed to its saturation pressure and condensed.

The CWF within the first pressure vessel is continuously and additionally compressed while additional unvaporizable liquid is being introduced to the first pressure vessel.

The energy storage system preferably further comprises at least one hydraulic turbine which is drivable by the unvaporizable liquid, wherein at least a portion of the unvaporizable liquid located within the first pressure vessel is propellable towards said at least one hydraulic turbine by the compressed CWF upon release from the second pressure vessel. The unvaporizable liquid discharged from the at least one hydraulic turbine is receivable in the liquid reservoir.

In one aspect, the delivering means is at least one hydraulic pump for delivering the unvaporizable liquid from the liquid reservoir to the first pressure vessel. The energy storage may further comprise at least one additional hydraulic pump for delivering the unvaporizable liquid from the first pressure vessel to the liquid reservoir.

In one aspect, the energy storage system further comprises a liquid-gas separator and/or a liquid-liquid separator located between the first and second pressure vessels for preventing flow of the unvaporizable liquid to the second pressure vessel.

In one aspect, the first pressure vessel is also exposed to ambient temperatures.

In one aspect, the energy storage system comprises a plurality of the first pressure vessels, wherein all of the first pressure vessels, or selected first pressure vessels, are in fluid communication with each other. Alternatively, none of the plurality of first pressure vessels are in fluid communication with each other.

In one aspect, the energy storage system comprises a plurality of the second pressure vessels, wherein all of the second pressure vessels, or selected second pressure vessels, are in fluid communication with each other. Alternatively, none of the plurality of second pressure vessels are in fluid communication with each other.

A method for producing power with stored energy, comprising the steps of providing a first pressure vessel and a second pressure vessel, wherein said second pressure vessel is capable of being in fluid communication with said first pressure vessel and is set to a temperature no greater than ambient temperatures; substantially isothermally compressing, within said first pressure vessel, a condensable working fluid (CWF) that is condensable at ambient temperatures during direct contact with an unvaporizable liquid and causing at least a portion of the compressed CWF to be transferred from said first pressure vessel to said second pressure vessel in response to interaction with the unvaporizable liquid; transferring an additional amount of compressed CWF to said second pressure vessel to cause all or a majority of the CWF within said second pressure vessel to be compressed to its saturation pressure and be condensed to produce liquid CWF; propelling at least some of the unvaporizable liquid located in said first pressure vessel by the compressed CWF discharged from said second pressure vessel towards at least one hydraulic turbine; and rotatably driving said at least one hydraulic turbine by the propelled unvaporizable liquid to produce power, wherein flow of the unvaporizable liquid to said second pressure vessel is prevented while the at least a portion of the compressed CWF is being transferred from said first pressure vessel to said second pressure vessel.

As referred to herein, the meaning of the term "flow of the unvaporizable liquid to said second pressure vessel is prevented" includes the possibility that only a negligible volume of the unvaporizable liquid relative to the volume of the liquid CWF within the second pressure vessel is introduced to the second pressure vessel. Prevention of flow of the unvaporizable liquid to the second pressure vessel is carried out by suitable apparatus such as a demister.

In one aspect, the CWF is substantially isothermally compressed by activating a unit of mixing equipment in fluid communication with the first or second pressure vessel and thereby eliminating temperature gradients within the CWF.

In one aspect, the unit of mixing equipment is activated in response to a sensed condition indicative of liquefaction of the CWF.

In one aspect, the at least some of the unvaporizable liquid located in said first pressure vessel is propelled by the compressed CWF discharged from said second pressure vessel towards the at least one hydraulic turbine when the discharged compressed CWF is in a liquid state, a gas state or in a multiphase state.

In one aspect, the step of causing at least a portion of the compressed CWF to be transferred from said first pressure vessel to said second pressure vessel is performed during a plurality of charging cycles.

In one aspect, the step of propelling at least some of the unvaporizable liquid located in said first pressure vessel by the compressed CWF discharged from said second pressure vessel is performed during a plurality of discharging cycles.

In one aspect, the method further comprises the steps of providing a third pressure vessel that is capable of being in fluid communication with said first pressure vessel, wherein, prior to performing one of a charging cycle or a discharging cycle, said third pressure vessel is completely filled with a first fluid selected from CWF gas or the unvaporizable liquid and said first pressure vessel is completely filled with a second fluid selected from CWF gas or the unvaporizable liquid which is different than the first fluid; and performing the one of a charging cycle or a discharging cycle such that, when terminated, said third pressure vessel is completely filled with the second fluid and said first pressure vessel is completely filled with the first fluid.

In one aspect, the method further comprises performing the other of a charging cycle or a discharging cycle when said third pressure vessel is completely filled with the second fluid and said first pressure vessel is completely filled with the first fluid.

In one aspect, the compressed CWF discharged from said second pressure vessel expands substantially isothermally during direct contact with the unvaporizable liquid within the first pressure vessel.

A direct contact fluid transfer (DCFT) module, comprising a first pressure vessel having at least four ports with each of which a corresponding conduit is in fluid communication, a second pressure vessel exposed to ambient temperatures which has one or more ports, and a flow control component operatively connected to each of said corresponding conduits for selectively controlling the flow therethrough of a fluid, wherein a condensable working fluid (CWF) which is condensable at ambient temperatures is introducible to said first pressure vessel through a first port of said at least four ports, wherein an unvaporizable liquid is introducible to said first pressure vessel through a second port of said at least four ports to cause substantially isothermal compression of the CWF upon direct contact with the unvaporizable liquid, wherein, following introduction of a sufficient additional volume of the unvaporizable liquid to said first pressure vessel, at least a portion of the compressed CWF is transferable from said first pressure vessel through a third port of said at least four ports to said second pressure vessel through one of said one or more ports upon direct contact with the unvaporizable liquid and is storable in a liquid state within said second pressure vessel after being compressed to its saturation pressure and condensed, wherein at least some of the unvaporizable liquid located in said first pressure vessel is propellable through a fourth port of said at least four ports by the CWF, when discharged from said second pressure vessel, to discharge stored energy.

DETAILED DESCRIPTION OF THE INVENTION

Significant heat losses experienced by the working fluid of prior art systems are advantageously avoided in the multiphase compressed gas energy storage system of the present invention by employing a condensable working fluid (CWF) that is normally gaseous but which condenses at ambient temperatures when being sufficiently compressed. In conjunction with the CWF, a liquid based direct contact fluid transfer (DCFT) module is employed to ensure that the CWF will undergo phase changes, whether in a charging mode or a discharging mode, substantially isothermally. The DCFT module is operable in conjunction with a transfer liquid that is ensured in remaining in a liquid state, and therefore relatively inexpensive hydraulic equipment interfacing with the flowing transfer liquid is advantageously able to employed, to both reduce system costs and increase the system round trip efficiency (RTE).

As referred to herein, "direct contact" means a heat transfer process that involves the exchange of heat between two fluids which are brought into physical mutual contact when the two fluids are at different temperatures. Also, "substantially isothermally", a condition whereby heat transfer occurs at a near to constant temperature, is defined as less than or equal to 5 percent of the absolute temperature differential between the final temperature and the initial temperature for an adiabatic heat transfer process having the same initial thermodynamic state as the given heat transfer process. Any deviation from a purely isothermal heat transfer process is due to a lower than required heat transfer coefficient, a smaller than required heat transfer area, or a shorter time than required for the heat transfer to take place.

Figure 1:
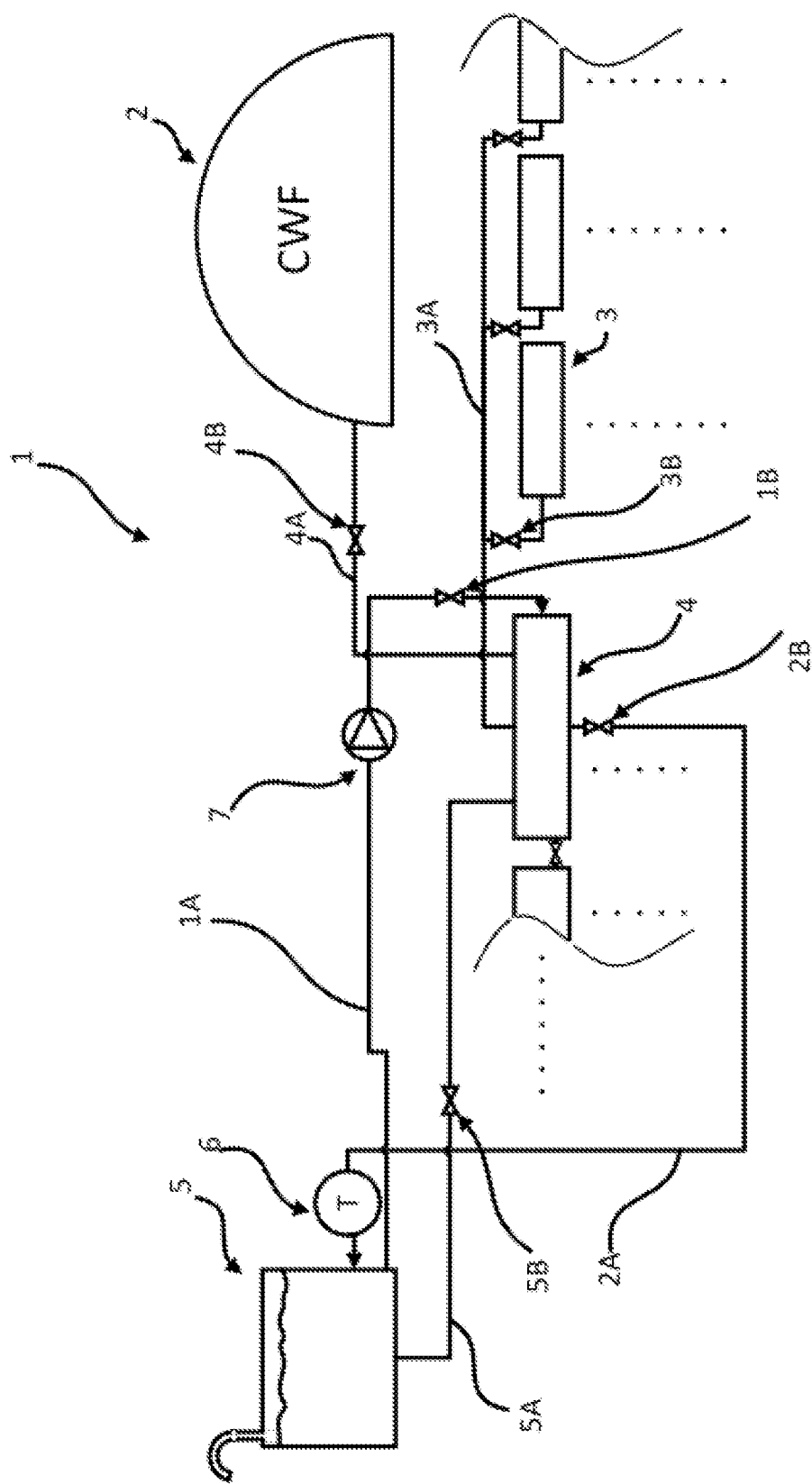
FIG. 1 is a schematic illustration of an embodiment of a multiphase energy storage system.

FIG. 1 schematically illustrates an embodiment of a multiphase energy storage system, generally indicated as 1, that is operable in both a charging mode and a discharging mode. Two fluids interact in system 1, the first being a multiphase CWF fluid and the second being a transfer liquid.

Multiphase energy storage system 1 comprises a gas holder 2 exposed to ambient temperatures for holding low pressure CWF gas of close to atmospheric pressure. Gas holder 2 is an inexpensive large-volume container, such as one delimited by a low strength membrane. In addition, system 1 comprises one or more compression tanks 4, constituting at least a part of the DCFT module, in fluid communication with gas holder 2, and one or more storage tanks 3 exposed to ambient temperatures and in fluid communication with each compression tank 4, for storing liquid CWF of high energy density at the end of the charging mode. The one or more compression tanks 4 may also be, non-limitingly, exposed to ambient temperatures. The one or more storage tanks 3 and compression tanks 4 are preferably pressure vessels that can withstand the relatively high pressure of compressed CWF gas. The transfer liquid, such as hydraulic oil or water, when held in liquid reservoir 5 may be exposed to air at atmospheric pressure and temperature to ensure that the transfer liquid will be maintained in liquid phase. Liquid reservoir 5 is in fluid communication with each compression tank 4 and also with hydraulic supply pump 7 and hydraulic turbine 6 used for exploiting the stored gas energy in the discharging mode. The transfer liquid is optionally immiscible with the CWF fluid.

Figure 2:
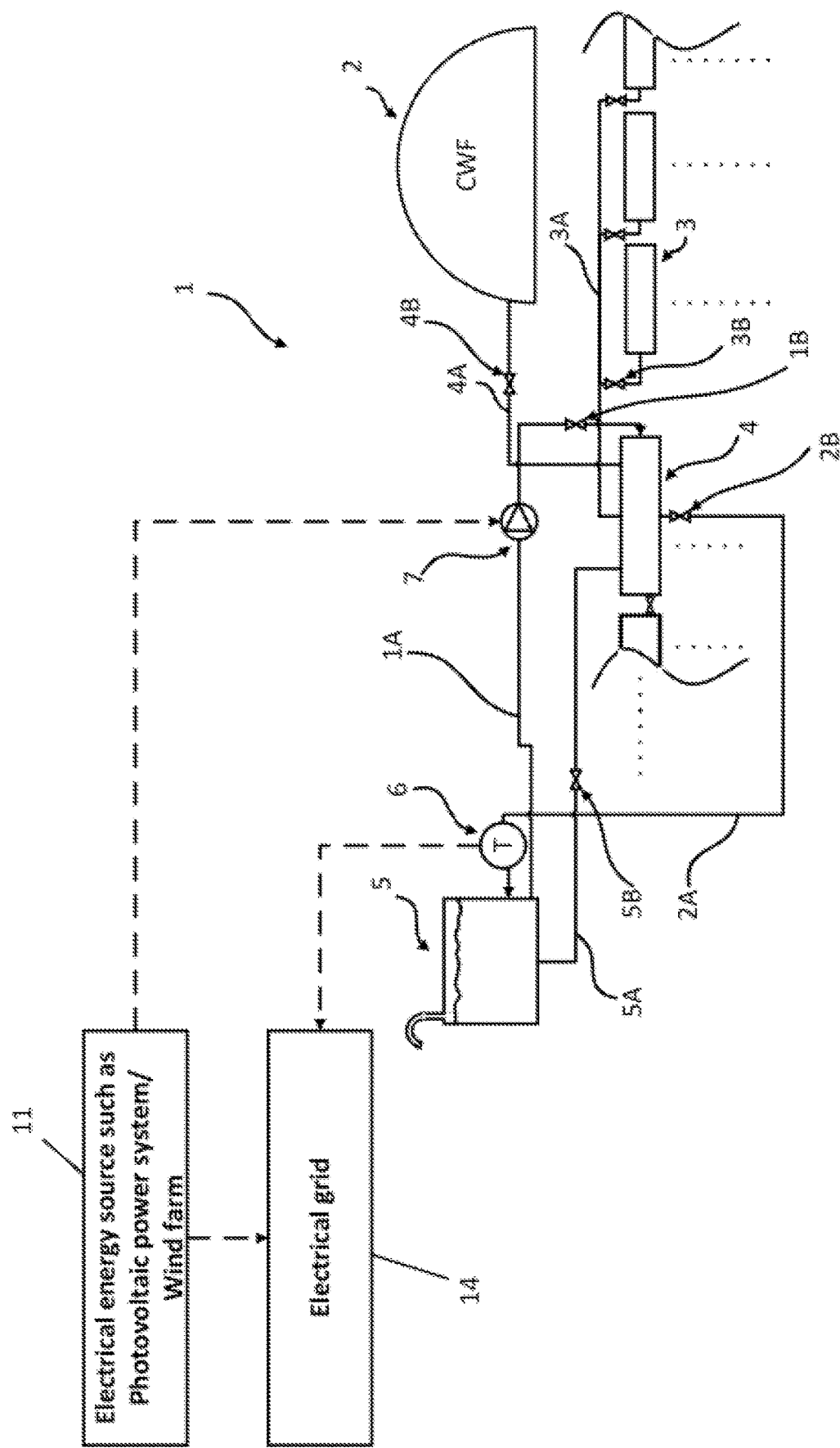
FIG. 2 is a schematic illustration of another embodiment of a multiphase energy storage system.

As shown in FIG. 2, costs for operating multiphase energy storage system 1 may be reduced by powering supply pump 7 as well as a return pump, if used, during the charging mode with electrical energy generated from a renewable energy source 11, such as a photovoltaic power system or a wind farm, or from any other energy source such as a power plant. The electrical power produced by renewable energy source 11 is generally supplied to electrical grid 14. When the power demand is lower than the power produced by the renewable energy source, the excess power can be delivered to the pumps to charge the system. An excess amount of electrical power produced by renewable energy source 11 may be used to power the supply and return pumps. Likewise, the electrical power produced by a generator coupled to hydraulic turbine 6 may be supplied to electrical grid 14. The system may also be powered by other means well known to those skilled in the art under certain conditions.

Figure 6:
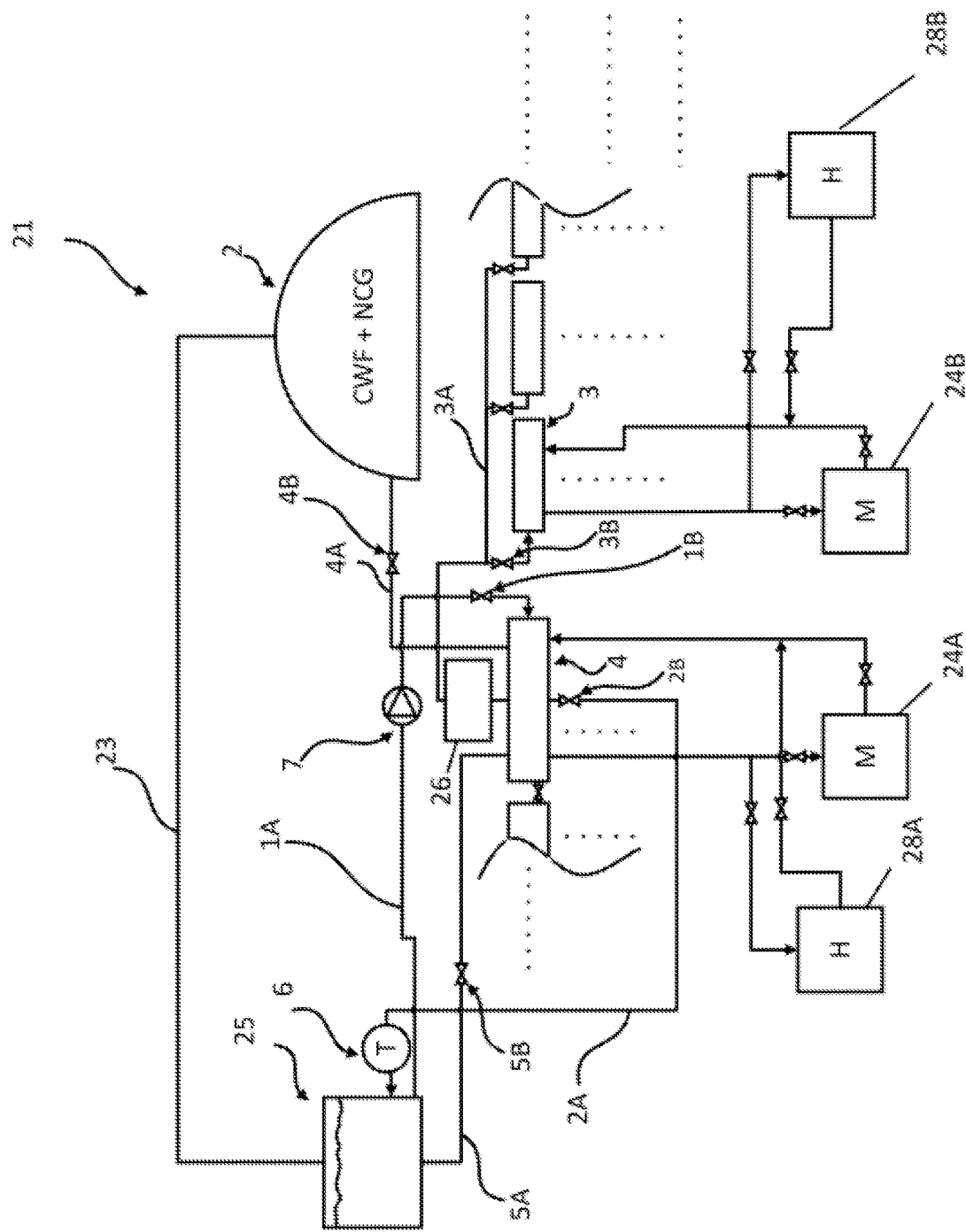
FIG. 6 is a schematic illustration of another embodiment of a multiphase energy storage system.

FIG. 6 illustrates another embodiment of a multiphase energy storage system, generally indicated as 21. System 21 is similar to system 1, and is configured with additional apparatus, such that each different component, such as gas discharge conduit 23, mixing equipment 24, liquid-gas separator 26, and heat exchanger 28, constitutes a further embodiment that provides advantageous features. With respect to energy storage system 21, liquid reservoir 25 is not exposed to the surrounding air, but rather is in fluid communication with gas holder 2 by gas discharge conduit 23, allowing any gas that has been de-gassed from the transfer liquid, after having been absorbed therein during the charging mode or discharging mode, to flow in return to the gas holder by a closed conduit circuit arrangement. The transfer liquid remains unvaporizable under the given thermodynamic conditions of the charging mode and discharging mode whereby the pressure of the transfer liquid is significantly higher than its saturation pressure for the controlled temperature range.

Figure 9:
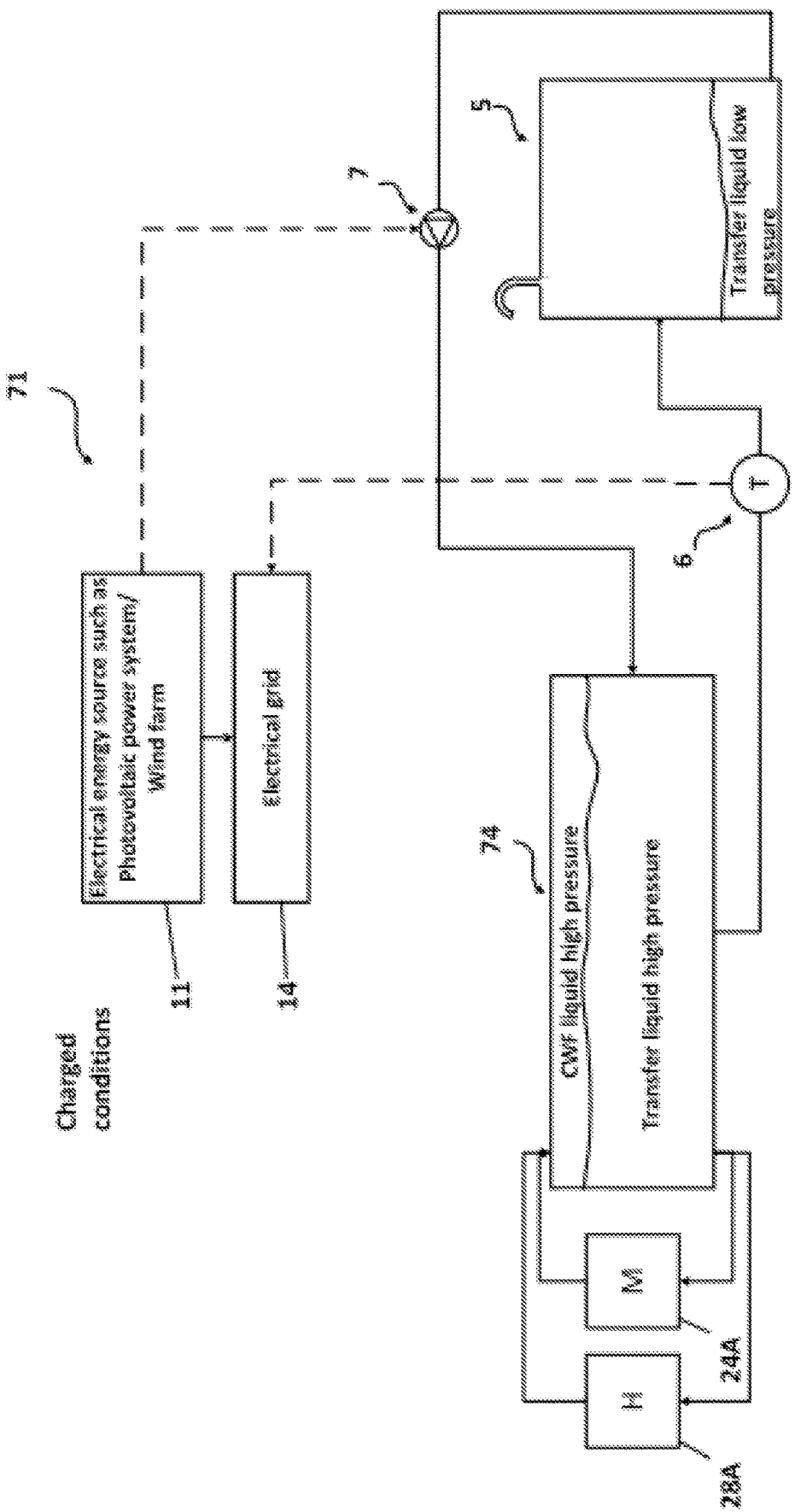
FIG. 9 is a schematic illustration of another embodiment of a multiphase energy storage system, shown during charged conditions.

FIG. 9 illustrates another embodiment of a multiphase energy storage system, generally indicated as 71. The cost effective system 71 comprises a single compression tank 74 exposed to atmospheric temperatures within which CWF is retained and is able to be condensed while being directly contacted by the unvaporizable transfer liquid, without need of a storage tank. Liquid reservoir 5 adapted to receive the transfer liquid is exposed to atmospheric air and pressure, and is in liquid communication with the liquid feed conduit to which hydraulic pump 7 is operatively connected and with the turbine inlet conduit to which hydraulic turbine 6 is operatively connected. System 71 may also interface with renewable energy source 11 and electrical grid 14, as described with respect to FIG. 2.

A supplementary gas tank (not shown) may be used to inject a supplementary amount of gas to a compression tank or to a gas holder if the current mass of gas retained in system 1 of FIG. 1 or system 71 of FIG. 9 is less than a minimal value needed for an efficacious operation for producing power from stored gas energy.

Charging Mode

Initially, with reference to multiphase energy storage system 71 of FIG. 9, the transfer liquid is retained in liquid reservoir 5, low-pressure CWF is retained in compression tank 74 and all valves are closed. After the liquid feed valve is opened and supply pump 7 is activated, transfer liquid is delivered to compression tank 74. The introduced transfer liquid reduces the available volume within compression tank 74 that the CWF is able to occupy, causing the CWF to become compressed. As additional transfer liquid is introduced, the CWF becomes increasingly compressed until its pressure is increased above its saturation pressure and condenses. The CWF is compressed substantially isothermally as a result of the direct contact with the transfer liquid. Upon conclusion of the charging mode, the liquid feed valve is closed and the supply pump is deactivated.

In pre-charging conditions with reference to system 1 of FIG. 1 and system 21 of FIG. 6, the CWF is retained in gas holder 2 in gas phase, being at atmospheric pressure or a pressure slightly thereabove, the transfer liquid is retained in liquid reservoir 5, and the one or more storage tanks 3 are precompressed with gas, and the one or more compression tanks 4 are filled with atmospheric gas or are filled with the transfer liquid.

Figure 4:
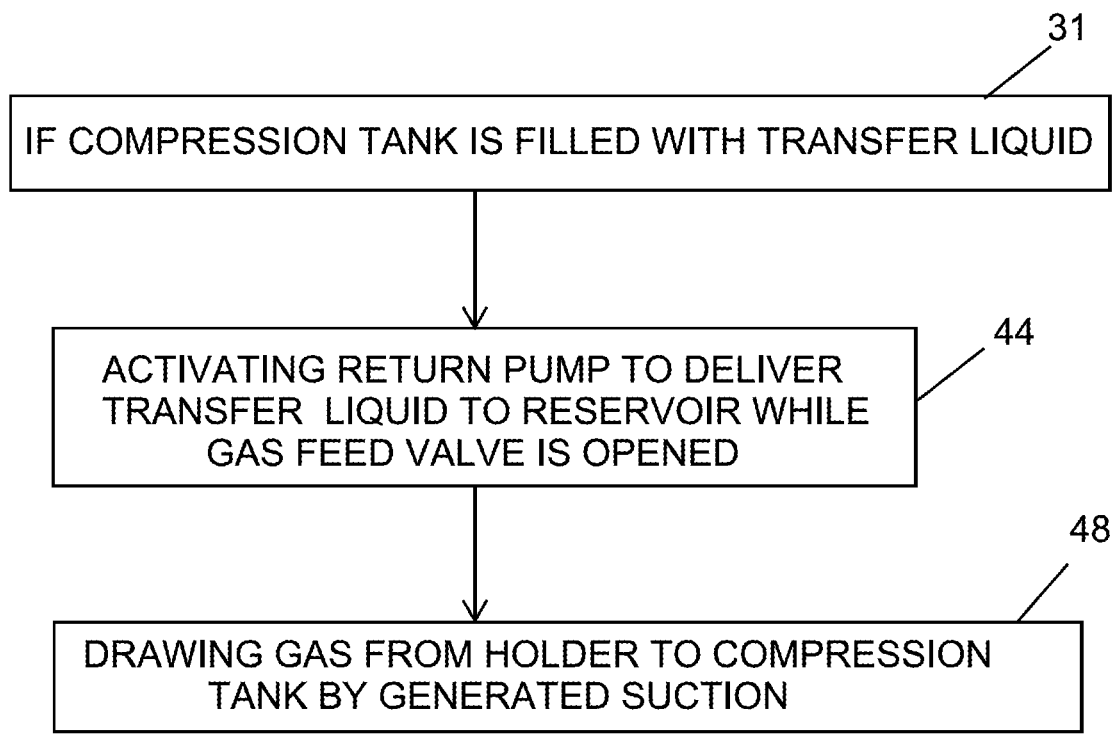
FIG. 4 is a method for delivering gas by suction driven flow.

If the one or more compression tanks 4 are filled with transfer liquid, the procedure described in relation to FIG. 4 is performed to urge delivery of the transfer liquid to liquid reservoir 5 while gas flows from gas holder 2 to one or more compression tanks 4.

When there is a sufficient volume of gas within the one or more compression tanks 4, the isolation valve 3B at the at least one port to each storage tank 3 is opened, to provide a combined interior volume that is common to each compression tank 3 and storage tank 4 via terminal conduit 3A extending therebetween. The gaseous CWF flows from each compression tank 4 through terminal conduit 3A is received in a storage tank 3 after flowing through isolation valve 3B without being discharged therefrom. If there are more than one storage tank 3, the gaseous CWF flows in parallel through a corresponding isolation valve 3B and port to the storage tank, although not all isolation valves 3B may be open at the same time.

Following introduction of a first portion of the CWF gas to the one or more tanks 3 and 4, liquid feed valve 1B operatively connected to a region of liquid feed conduit 1A extending from liquid reservoir 5 to the one or more compression tanks 4 that is downstream to supply pump 7 which is also operatively connected to liquid feed conduit 1A is opened. Hydraulic supply pump 7 is activated, and is caused to deliver the transfer liquid from reservoir 5 to the one or more compression tanks 4.

The transfer liquid that is being introduced to the one or more compression tanks 4 reduces the combined volume of tanks 3 and 4 that is occupied by the CFW gas. Consequently the CFW gas is able to be compressed within the interior of a compression tank 4. As more transfer liquid is introduced to the one or more compression tanks 4, the combined volume of tanks 3 and 4 that is occupied by the CFW gas is reduced and the CFW in both gas tanks 3 and 4 becomes additionally compressed. During compression, the CWF gas is directly contacted and cooled by the transfer liquid to reduce the heat of compression, such that the CWF gas is able to undergo compression at a substantially constant temperature. Eventually, the one or more compression tanks 4 are completely occupied by the transfer liquid while the CWF gas that was formerly in the one or more compression tanks 4 is displaced to the one or more storage tanks 3, causing the CFW gas within the one or more storage tanks 3 to be further compressed. The CWF received in the one or more storage tanks 3 liquefies once it is compressed to at least saturation pressure. All valves are then closed to complete a cycle of the charging mode.

If the pressure of the CWF received in the one or more storage tanks 3 is less than saturation pressure, additional cycles of the charging mode may be performed. During each additional cycle, another gas portion is fed to a compression tank 4 to increase the pressure of the stored CWF fluid.

Figure 3:
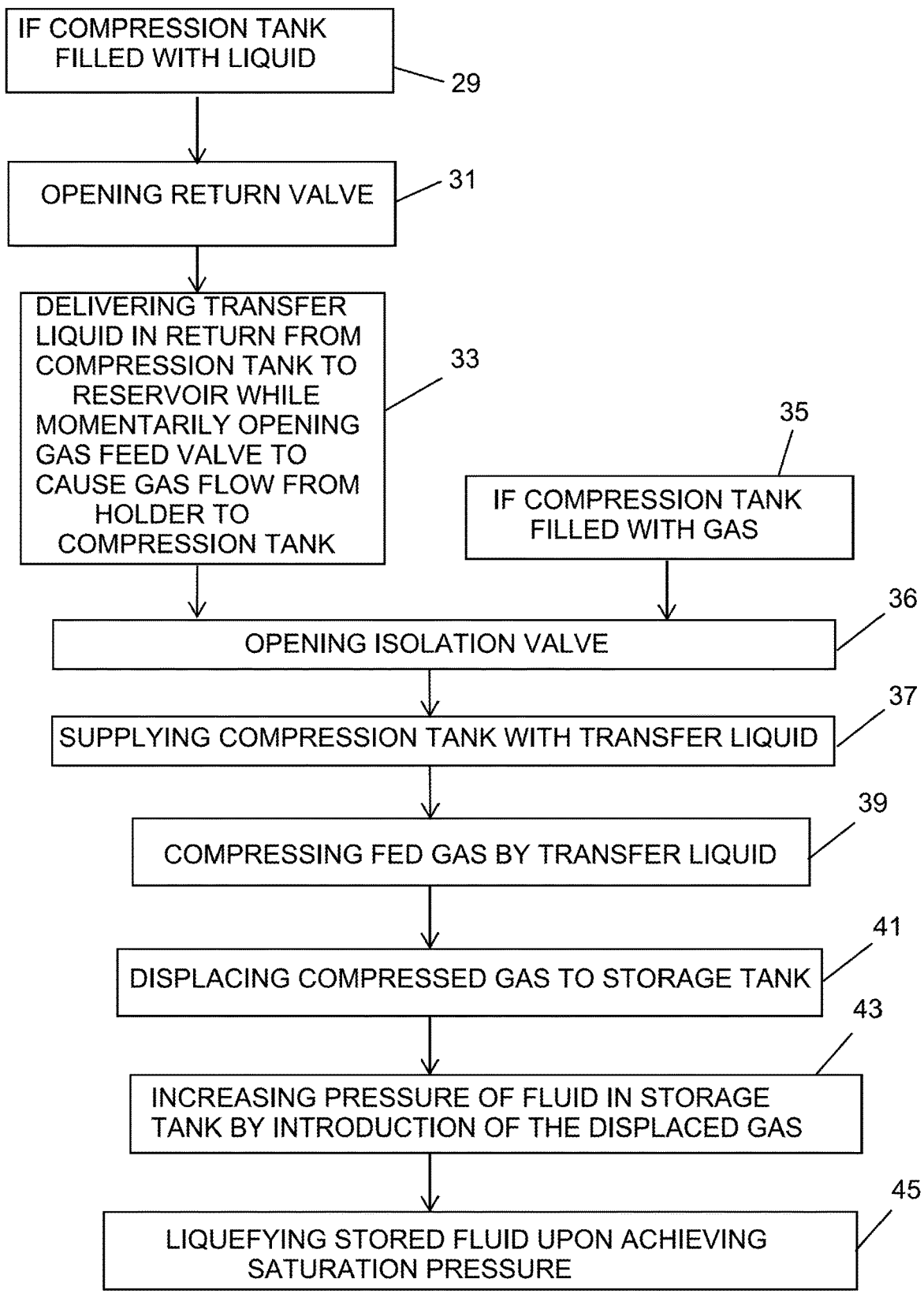
FIG. 3 is a flow chart representing various steps that are involved during the performance of a cycle of the charging mode, according to one embodiment.

FIG. 3 illustrates various steps that are involved in the performance of a cycle of the charging mode in conjunction with system 1 of FIG. 1 and system 21 of FIG. 6, according to one embodiment.

To initiate an additional cycle of the charging mode, or alternatively a first cycle thereof, when the one or more compression tanks 4 is filled with the transfer liquid in step 29, return valve 5B operatively connected to another conduit 5A extending from liquid reservoir 5 to the one or more compression tanks 4, i.e. the return conduit, is opened in step 31 to cause the transfer liquid to be delivered from the one or more compression tanks 4 in return to reservoir 5. At the same time, gas feed valve 4B is momentarily opened to cause flow of a gas portion from the gas holder 2 to the one or more compression tanks 4.

All valves are closed once the transfer liquid has returned to reservoir 5. Afterwards, each isolation valve 3B is opened in step 36. Supply pump 7 is then activated in step 37 to supply the one or more compression tanks 4 with transfer liquid, so that the CWF gas that has been fed from the gas holder to the one or more compression tanks 4 in the current cycle will be compressed in step 39 and subsequently displaced in step 41 to the one or more storage tanks 3 by the transfer liquid. The introduction of additional CWF gas to the one or more storage tanks 3 increases the pressure of the stored CWF gas in step 43. Eventually after one or more cycles, the pressure of the ambient-temperature CWF received in the one or more storage tanks 3 increases to the saturation pressure and then liquefies in step 45.

If the one or more compression tanks 4 is filled with gas in step 35, the charging mode cycle proceeds to step 36.

In another embodiment, gas is fed to the one or more compression tanks via the gas feed valve in step 33 and steps 37 and 39 are performed to compress the fed gas within the one or more compression tanks while the isolation valve at the inlet port of each storage tank is closed to increase the pressure that is building up in a compression tank. After an isolation valve is then opened, the compressed fluid is displaced by the transfer liquid to a storage tank. The displaced fluid may be in a gaseous state or a two-phase liquid-vapor state, undergoing first stage compression in a compression tank and second stage compression in a storage tank until completely liquefying.

In another embodiment shown in FIG. 4, a portion of gas is drawn from the gas holder by suction, if for example the pressure differential between the gas holder and compression tank is relatively low. Such suction driven flow is made possible when the one or more compression tanks are filled with transfer liquid in step 31. While the gas feed valve is opened, the return pump operatively connected to the return conduit extending between the one or more compression tanks and the reservoir is activated in step 44. The flow of the transfer liquid through the return conduit in the direction of the reservoir generates a suction that draws gas from the gas holder to the one or more compression tanks in step 48.

The volume of CWF fluid at a given pressure that can be stored when in a liquid state is significantly smaller than when provided in a gaseous state, and therefore the ability of systems 1, 21 and 71 to store the CWF in a liquid state significantly increases the energy density, i.e. the potential stored energy per volume, of the working fluid relative to the prior art practice of storing the working fluid in a gaseous state. The energy density achievable by the CWF is also able to be advantageously increased by virtue of the substantially isothermal compression and expansion, which results in reduced heat loss. The capital cost of the small-volume storage tanks 3 is substantially less than the large-volume storage tanks that are needed to store compressed gas in a gaseous state.

The energy density of the fluid stored in the one or more storage tanks 3 may be additionally increased, as shown in system 21 of FIG. 6, when gas holder 2 contains an additional low-pressure gas which is a non-CWF but which is mixable with the CWF, such as air or a non-condensable gas (NCG). This mixture is compressed in step 39 and transferred to the one or more storage tanks in step 41. After the CWF is liquefied in step 45, the non-CWF gas is able to be additionally compressed, such as in response the introduction of an additional volume of the transfer liquid to a compression tank 4, to further increase the energy density of the stored fluid. It will be appreciated that a non-CWF may also be mixed with the CWF to increase the energy density of the stored compressed fluid in systems 1 and 71.

The high energy density of the CWF received in the one or more storage tanks 3 is advantageous since more energy is able to be released from the stored CWF in the discharging mode.

With reference to multiphase energy storage system 21 schematically illustrated in FIG. 6 according to another embodiment, the energy density of the CWF transferred to a storage tank 3 is able to be further increased by preventing the flow of the transfer liquid into each storage tank, so that more CWF is able to occupy a storage tank interior and to be condensed. The flow of transfer liquid into a storage tank may be prevented by deploying a liquid-gas separator 26, or a liquid-liquid separator when the CWF condenses as well within a compression tank, at the inlet of the storage tank port. Liquid-gas separator 26 may be for example one that forces the transfer liquid to fall under the influence of gravity within the liquid-gas separator and return to a compression tank 4. Liquid-gas separator 26 may also be embodied by a buffer tank located above the height of each compression tank 4. Liquid-gas separator 26 or a liquid-liquid separator may be operatively connected to conduit 27, which extends from a dedicated outlet provided with a corresponding compression tank 4 to terminal conduit 3A with which it is in fluid communication.

Despite the lack of direct contact between the transfer liquid and the CFW fluid within the one or more storage tanks 3 when systems 1 and 21 employ a liquid-gas separator 26, the CFW is able to be isothermally compressed as a result of the cooling effect provided by the ambient-temperature air or ground surrounding the one or more storage tanks 3. Additionally, the heat of compression is able to be reduced or altogether eliminated when the CFW is slowly compressed, for example on the order of several hours.

Alternatively or additionally, as schematically illustrated in multiphase energy storage systems 21 of FIGS. 6 and 71 of FIG. 9, isothermal compression may be ensured by means of mixing equipment. A unit 24B of mixing equipment set in fluid communication with a corresponding storage tank 3 may be activated when the CWF starts to liquefy, such as when achieving a two-phase liquid-vapor state. The liquid and vapor portions of the CWF will be able to be mixed together to eliminate temperature gradients within the stored CWF by providing a fluid with a substantially uniform temperature and heat transfer coefficient, and also absorbing any released heat of compression. Unit 24B may be activated in response to the detection of a predetermined pressure within the corresponding storage tank 3 or the detection of the presence of liquid, by a relevant sensor. Likewise a unit 24A of mixing equipment, which may be identical to or different from unit 24B, may be set in fluid communication with a corresponding compression tank 4.

The mixing equipment may assume various forms. The mixing equipment, such as an agitator, may be rotatably mounted with the corresponding tank. An agitator provides homogeneity of the stored fluid in terms of temperature, heat transfer coefficient, as well as in terms of composition to mix any particles that may have settled out of the compressed liquefied solution.

The mixing equipment may also be deployed externally to the corresponding tank. In one embodiment, the mixing equipment is configured with a set of conduits and nozzles, whereby a fluid portion at one region of the tank is bled through one of the conduits, such as in conjunction with a pump, and is injected to another region of the tank through one or more nozzles. This arrangement may also facilitate circulation of the transfer liquid between two or more of the compression tanks 4, which may be interconnected, or from one or more of the compression tanks 4 to one or more of the storage tanks 3, which may also be interconnected.

Also, a heat exchanger 28A set in heat exchanger relation with the one or more compression tanks 4 or a heat exchanger 28B set in heat exchanger relation with the one or more storage tanks 3 may be provided to assist in achieving isothermal compression. Each of the heat exchangers may be of the shell and tube type, finned tube type, plate heat exchanger type, air cooled type, or any other heat exchanger type well known to those skilled in the art. The tubes through which the cooling medium flows, when employed, may be shared with the conduits associated with the mixing equipment, such as when one or more valves are selectively opened and/or closed to permit flow to a feat exchanger or to a mixing equipment unit. More than one heat exchanger may be employed, and each one may be of the same type or of a different type.

Discharging Mode

The condensed CWF is able to remain stored for a prolonged period of time while being subjected to the charged conditions until the discharging mode is initiated. The discharging mode is generally initiated during peak demand or during periods when there is a shortage in energy availability as the energy stored in the multiphase energy storage system is able to be discharged whenever desired and to produce electricity supplied to the grid.

During the discharge mode, transfer liquid is propelled by high-pressure liquid CWF towards the hydraulic turbine in order to produce electricity. By using a transfer liquid for causing compression of the CWF during the charging mode and for being propelled by the CWF during the discharging mode, a hydraulic turbine may advantageously be employed to produce power, as opposed to a gas turbine used by prior art compressed gas storage systems. Advantages of the use of a hydraulic turbine relative to a gas turbine include higher efficiencies, lower rotational speeds, easier maintainability and lower running costs.

These advantages are also relevant to the use of a hydraulic pump by the multiphase energy storage system as opposed to the use of a compressor for introducing compressed gas by a prior art compressed gas storage system.

Referring now to multiphase energy storage system 71 of FIG. 9, CWF liquid and high-pressure transfer liquid are retained within compression tank 74 in anticipation of the subsequent initiation of the discharging mode. Since the CWF fluid has been compressed to its saturation pressure, which is significantly greater than its pressure during pre-charging conditions, and transfer liquid is retained in the same closed compression tank 74 as the CWF liquid, the CWF liquid applies a force onto the transfer liquid that causes the transfer liquid to be pressurized to the same saturation pressure as the CWF liquid. The pressurized transfer liquid located within compression tank 74 is at a significantly higher pressure than the atmospheric pressure to which the transfer liquid retained within liquid reservoir 5 is exposed.

When the turbine injection valve is opened to initiate the discharging mode, the high-pressure transfer liquid is urged to be discharged from compression tank 74 with sufficiently high kinetic energy to rotatably drive hydraulic turbine and produce power due to the high pressure differential between the high-pressure transfer liquid within compression tank 74 and the low-pressure transfer liquid within liquid reservoir 5. In response to the discharge of high-pressure transfer liquid from compression tank 74, additional volume of compression tank 74 that is unoccupied by the transfer liquid is made available to the CWF, which is consequently able to expand and to achieve a two phase vapor-liquid state. It is noted that since the multiphase CWF expands isobarically, the pressure of the CWF and of the transfer liquid pressurized thereby is unchanged, thereby allowing the power output to be continuous for a period of time. Once the CWF achieves a gaseous state, the pressure of the high-pressure transfer liquid is reduced. Nevertheless, the pressure of the propelled transfer liquid, until reduced below a turbine-specific threshold, is sufficiently high to rotatably drive hydraulic turbine 6 and to produce power. At the end of the discharging mode, the turbine injection valve is closed and the liquid feed valve is opened.

By virtue of the simplicity of system 71, transfer liquid is able to be cycled back and forth between liquid reservoir 5 and compression tank 74 during alternate performance of the charging and discharging modes, respectively, in a similar fashion as a piston to produce additional power.

In pre-discharge conditions with reference to system 1 of FIG. 1 and system 21 of FIG. 6, all valves are closed and the CWF fluid retained in the one or more storage tanks 3 is in liquid phase, after having been exposed to the ambient temperature of the storage tanks and been compressed to a relatively high pressure. If mixed together with the CWF fluid, non-CWF gas compressed to a higher pressure than that of the CWF liquid is also retained within the one or more storage tanks 3.

Figure 5:
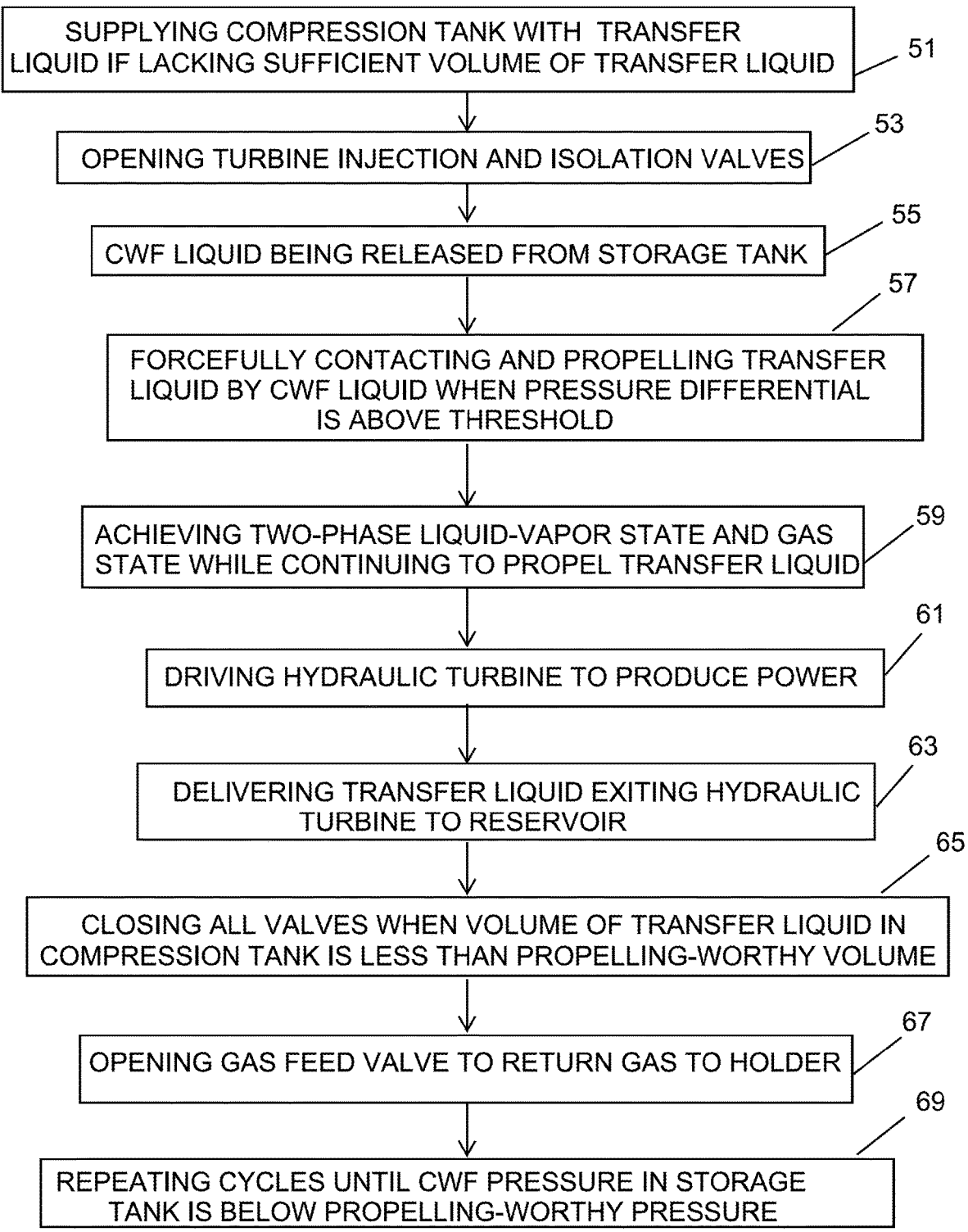
FIG. 5 is a flow chart representing various steps that are involved in the performance of the discharging mode, according to one embodiment.

FIG. 5 illustrates various steps that are involved in the performance of the discharging mode, according to one embodiment.

In a first step 51 of the discharging mode, return valve 5B is momentarily opened, allowing transfer liquid received in reservoir 5 of a relatively high hydraulic head to flow through return conduit 5B and fill the one or more compression tanks, if no transfer liquid is currently contained within any of the compression tanks 4 following the final cycle of the charging mode. Alternatively, liquid feed valve 1B may be momentarily opened and supply pump 7 may be operated to feed a required volume of transfer liquid to the one or more compression tanks 4. This step may be dispensed with if there is a sufficient volume of transfer liquid within the one or more compression tanks 4. Each of the compression tanks may be equipped with a sensor, such as a capacitance level sensor or a float switch, to determine the presence of a predetermined level of transfer liquid, and possibly also with a pressure sensor. Return valve 1B or valve 5B is then closed to prevent return flow of the transfer liquid.

In step 53, turbine injection valve 2B and at least one storage tank isolation valve 3B are opened. The high-pressure compressed fluid including at least CWF liquid will consequently be released from a storage tank 3 in step 55 via terminal conduit 3A with which a corresponding opened isolation valve 3B is in fluid communication due to the exposure to the lower pressure in compression tank 4 and expand to a small degree. The released CWF liquid forcefully contacts the transfer liquid in step 57 within each compression tank 4 and, as a result of the pressure differential between the CWF liquid and the transfer liquid in the liquid reservoir, causes the transfer liquid to be propelled through turbine inlet conduit 2A to which turbine injection valve 2B is operatively connected. The transfer liquid is able to be propelled as long as the pressure differential between the transfer liquid that is propelled by the CWF, which is at the same pressure as the CWF, and the transfer liquid in liquid reservoir 5 downstream to the hydraulic turbine 6 is greater than a predetermined threshold. The CWF liquid is able to evaporate and achieve a two-phase liquid-vapor state while being isobarically expanded in step 59 as a result of the greater volume within the combined interior of tanks 3 and 4 that it occupies in response to the displacement of the transfer liquid. The pressure of the multiphase CWF fluid and also of the CWF when in an entirely gaseous phase is sufficiently high to continue propelling the transfer liquid through turbine inlet conduit 2A. By virtue of the direct contact between the CWF gas and the transfer liquid, a change in temperature of the CWF gas is reduced, allowing the CWF gas to expand substantially isothermally. This expansion process continues while the transfer liquid is increasingly propelled and the CWF fluid which achieves a completely gaseous state occupies an increased volume. The transfer liquid propelled through turbine inlet conduit 2A consequently rotatably drives hydraulic turbine 6 in step 61 to produce power. The transfer liquid exiting hydraulic turbine 6 flows to reservoir 5 in step 63 to increase the liquid level within the liquid reservoir. All valves are closed to complete a cycle of the discharge mode in step 65 when the volume of the transfer liquid remaining in the one or more compression tanks is less than a propelling-worthy volume. Afterwards, gas feed valve 4B is opened in step 67, causing the gas remaining in the one or more compression tanks to flow back to gas holder 2 through gas feed conduit 4A due to a pressure differential between the one or more compression tanks 4 and the gas holder 2.

Thus the use of the phase changing CWF fluid during the discharging mode does not reduce the amount of power that is able to be extracted, but rather the multiphase CWF fluid is involved in continuing to propel the transfer liquid towards the hydraulic turbine to produce an additional amount of power. This power extraction ability is in addition to the advantage provided by the condensing fluid whereby the volume of the compression and storage tanks is allowed to be reduced.

One or more cycles involving the steps above may be repeated in the discharge mode if the pressure of the fluid including at least CWF that remains in the one or more storage tanks 3 is sufficiently greater than atmospheric pressure to facilitate propulsion of the transfer liquid. That is, step 51 is performed to refill the one or more compression tanks 4 with transfer liquid from reservoir 5 if they have become sufficiently emptied, and then the refilled transfer liquid is propelled in step 57 by the fluid released from the one or more storage tanks. Additional cycles may be repeated until the pressure of the gas within the one or more storage tanks 3 is lowered in step 69 to a pressure below a propelling-worthy pressure at which the transfer liquid is capable of being propelled.

The sequence of the various steps of both the charging and discharging modes is able to be controlled manually upon manipulating the various flow control devices, or alternatively automatically in response to the operation of a controller. Each step may be performed in response to a timed or sensed action commanded by the controller. Through the intervention of the controller, a charging step and a discharging step may be synchronized to provide a continuous discharging operation.

By employing a large-volume gas holder 2 and by performing a plurality of charging and discharging cycles, the volume of the one or more compression tanks 4 is advantageously able to be reduced, for lower costs. Depending on the gas energy storage need, systems 1 and 21 can be scaled up or down by a change in the number or size of one or more tanks. When system 1 or system 21 comprises a plurality of storage tanks 3 and compression tanks 4, each of the storage tanks and each of the compression tanks may be interconnected. For a more efficient transfer operation, a different step may be performed simultaneously in conjunction with two different tanks. For example, liquid transfer can flow to a first compression tank 4 at the start of another discharging cycle, while at the same time in a second compression tank the liquid transfer is propelled by expanding CWF in an a different discharging step to rotatably drive the hydraulic turbine.

Figure 7:
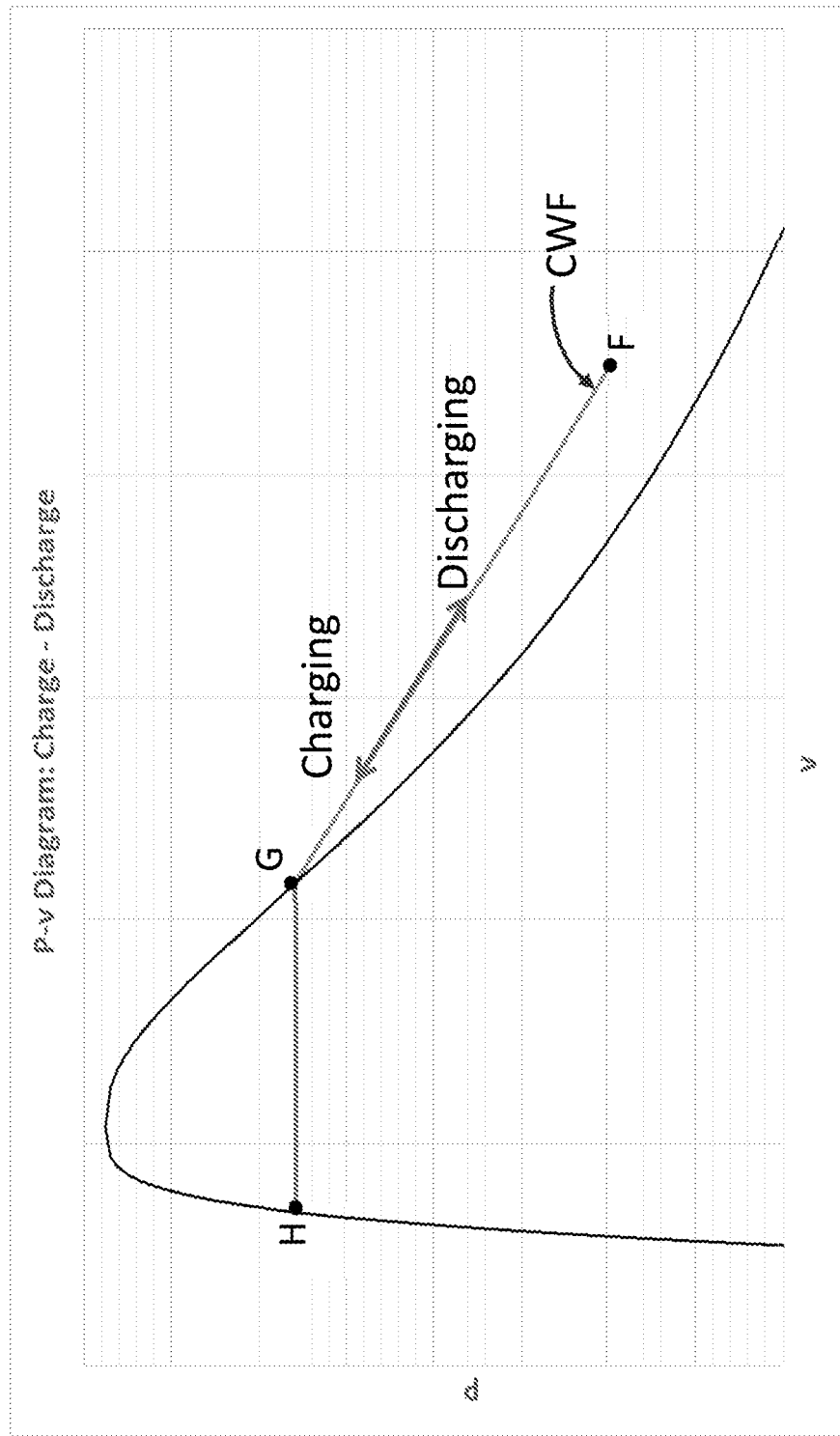
FIG. 7 is an exemplary pressure-volume diagram for the energy storage system of FIG. 1.
Figure 8:
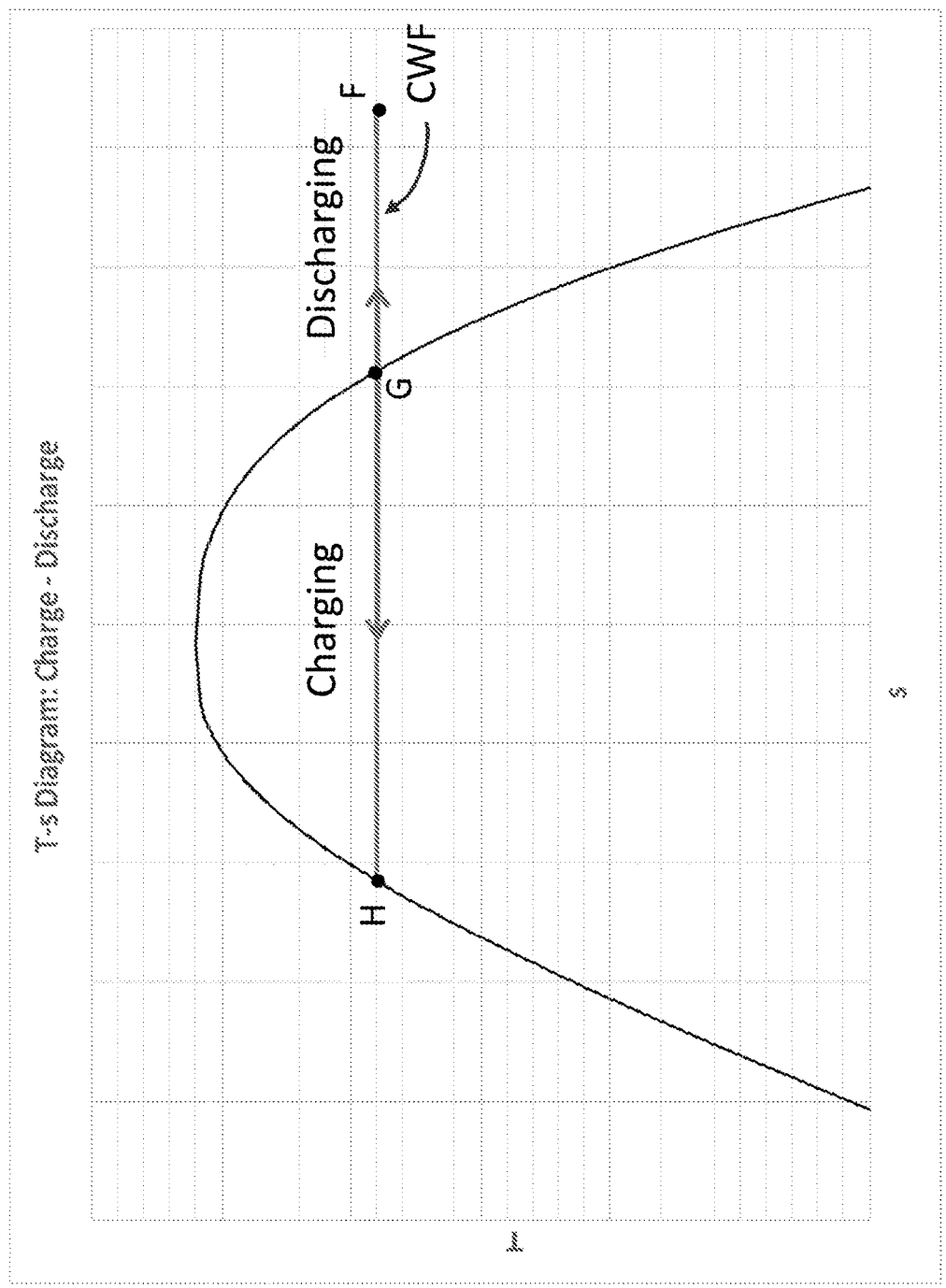
FIG. 8 is an exemplary temperature-entropy diagram for the energy storage system of FIG. 1.

FIGS. 7 and 8 illustrate various exemplary thermodynamic states of the CWF fluid. At state F, CWF gas is introduced to a compression tank, for example from the gas holder, at a relatively low pressure, and the pressure of the CWF gas is steadily increased in response to the introduction of transfer liquid into the compression tank, to the saturation pressure of the CWF at state G. The CWF, after undergoing a phase change at state G to assume a two-phase fluid, is isobarically condensed until being completely liquefied to occupy a minimal volume at state H. By direct contact with the transfer liquid and influence of the surroundings, the CWF is isothermally compressed throughout the charging mode from state F to state H. These conditions are reversed when the CWF fluid is isothermally expanded throughout the discharging mode from state H to state F.

Although only a single hydraulic turbine 6 is shown is FIGS. 1, 6 and 9, it is appreciated that more than one hydraulic turbine may be employed. When the pressure of the CWF propelling the transfer liquid is sufficiently high as detected by sensors, more than one hydraulic turbine stage may be used to produce an additional amount of power. A different turbine type may be used for each stage in order to maximize efficiency with respect to the designed operating conditions of a specific stage, such as a predetermined range of pressure drop, specific speed or head. Alternatively, a plurality of turbines in parallel may be employed. A controller receiving pressure readings as detected by sensors is able to command a flow control component such as a valve at the outlet of a first stage turbine to urge delivery of the transfer liquid exiting the first stage turbine to the inlet of a second stage turbine and to rotatably drive the second stage turbine.

It will be appreciated that a plurality of supply pumps in parallel or in line may be used.

As described hereinabove, a plurality of charging and discharging cycles are able to be alternately performed with respect to an energy storage system, a charging cycle being repeatable if the CWF pressure is less than saturation pressure and a discharging cycle being repeatable if the pressure of the propelling fluid including at least CWF is sufficiently greater than atmospheric pressure to facilitate propulsion of the transfer liquid.

Figure 10:
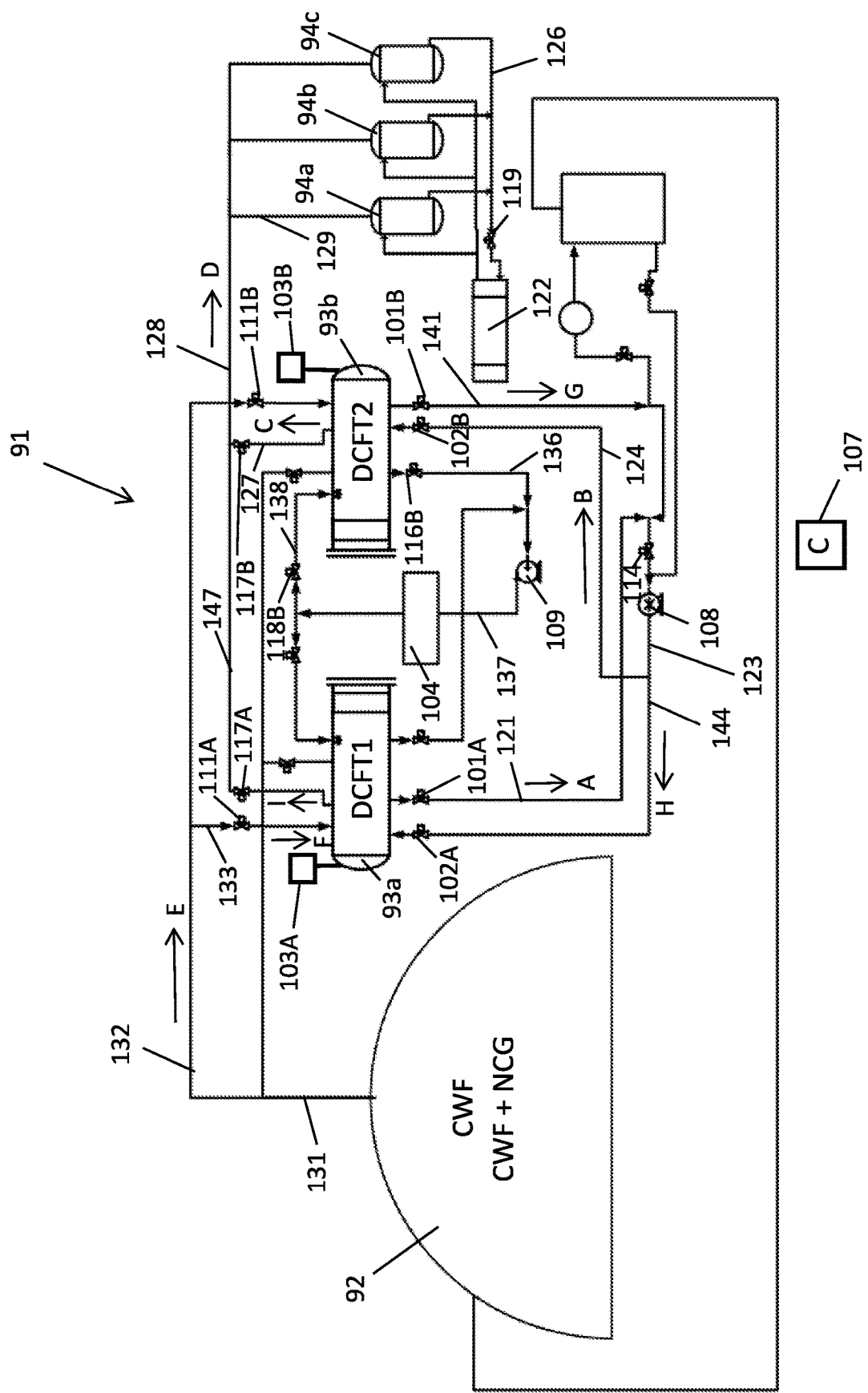
FIG. 10 is a schematic illustration of another embodiment of a multiphase energy storage system, showing operations performed during a charging cycle.
Figure 11:
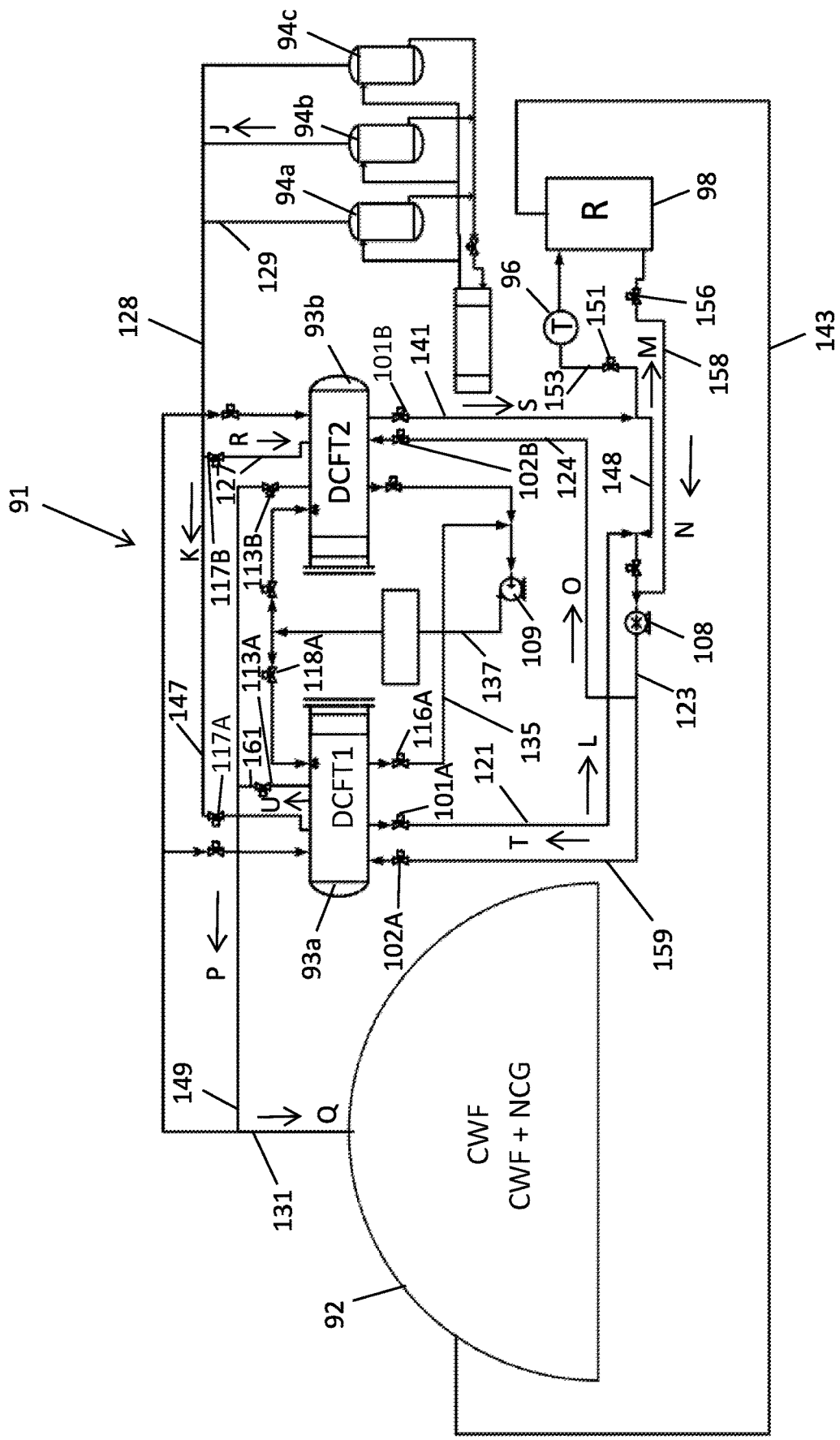
FIG. 11 is a schematic illustration of the multiphase energy storage system of FIG. 10, showing operations performed during a discharging cycle.

FIGS. 10 and 11 illustrate another embodiment of a multiphase energy storage system, generally indicated as 91. System 91 is a closed system that comprises two or more DCFT modules that are each capable of being in fluid communication with the gas holder, the one or more storage tanks, the hydraulic turbine and at least another DCFT module. By being provided with two or more DCFT modules, charging or discharging cycles are advantageously able to be repeatedly performed with a minimal waiting time between subsequent cycles.

Multiphase energy storage system 91 comprises a gas holder 92 exposed to ambient temperatures, which is shown to hold low pressure CWF gas of close to atmospheric pressure as well as an additional low-pressure non-CWF gas, such as air or an NCG, but which may hold only CWF. In addition, system 91 comprises two or more DCFT modules, e.g. DCFT modules 93a and 93b, one or more storage tanks, e.g. three storage tanks 94a-c, exposed to ambient temperatures for storing CWF, particularly liquid CWF or a mixture of liquid CWF and NCG of high energy density at the end of the charging mode, at least one hydraulic turbine 96, low pressure liquid reservoir 98 for receiving the liquid discharged from hydraulic turbine 96, and pumps 108 and 109. The DCFT modules 93a-b, which may be referred to as the "first module" and "second module", respectively, are preferably pressure vessels that can withstand the relatively high pressure of compressed CWF gas. The fluid retained by gas holder 92 and flowable within the energy storage system may also be referred to as "CWF-based fluid". A schematically illustrated controller 107 in data communication with at least pumps 108 and 109 and the valves synchronizes flow of the transfer liquid and of the CWF-based fluid.

FIG. 10 illustrates operation of system 91 during the charging mode. In pre-charging conditions, all valves are closed. Also, the first DCFT module 93a is filled with the unvaporizable transfer liquid, and the second DCFT module 93b, as well as storage tanks 94a-c, are filled with CWF or a mixture of CWF and non-CWF gas, which is maintained in a gas phase and at a predetermined pre-compressed pressure prior to being compressed by the transfer liquid. First DCFT module 93a, second DCFT module 93b, and storage tanks 94a-c may be prefilled by well-known means such as with a pump and valve, or by any other suitable means.

Pressure control means 103B connected to second DCFT module 93b, which may be in data communication with the controller, ensures that the interior of the second module achieves the predetermined pre-compressed pressure. Pressure control means 103B may be embodied by means well known to those skilled in the art such as a pressure gauge and a pressure regulator, and optionally may also comprise an isothermal compressor for quickly increasing the gas pressure within the interior of the second module while the heat of compression is minimized. Similar pressure control means 103A may be connected to first DCFT module 93a.

To initiate a first charging cycle, first module liquid discharge valve 101A, second module liquid inlet valve 102B, liquid feed valve 114, first module gas inlet valve 111A, second module gas inlet valve 111B, and second module gas transfer valve 117B are opened. As second module gas inlet valve 111B is opened and is in fluid communication with gas holder 92, the pressure of gas within the gas holder is also maintained at the predetermined pre-compressed pressure. First pump 108 is then activated and the transfer liquid is delivered from first module 93a to second module 93b, flowing in the direction of arrow A through conduit 121 extending from a first port of the first module, through conduit 123 with which first pump 108 and liquid feed valve 114 are operatively connected, and in the direction of arrow B through conduit 124 extending from the end of conduit 123 to a second port of second module 93b.

The transfer liquid that is being introduced to second module 93b reduces the volume therewithin that is occupied by the retained gas. Consequently the retained gas is able to be compressed within the interior of second module 93b. During compression, the retained gas is directly contacted and cooled by the transfer liquid to reduce the heat of compression, such that the retained gas is able to undergo substantially isothermal compression. When second module 93b is being filled with the transfer liquid, the compressed CWF-based gas is urged to be displaced and to flow across a sixth port thereof, flowing in the direction of arrow C through conduit 127 and of arrow D through conduit 128 and the corresponding conduits 129 to a first port of the one or more storage tanks 94a-c. The compressed gas transferred from second module 93b causes the stored CWF-based gas in each of the one or more storage tanks 94a-c to become additionally compressed.

Substantially isothermal compression of the CWF-based fluid may be ensured by circulating cooling transfer liquid located at the bottom of second module 93b by means of second pump 109 in a closed loop across fourth and fifth ports of the second module and through conduits 136-138, when isolation valve 116B operatively connected to conduit 136 and isolation valve 118B operatively connected to conduit 138 are opened. The degree of cooling provided by the circulating transfer liquid may be increased by means of a heat exchanger 104 in heat exchanger relation with conduit 137. Alternatively or additionally, mixing equipment or spray nozzles in use when isolation valves 116B and 118B are opened are able to assist in ensuring substantially isothermal compression.

In response to the pumped discharge of transfer liquid from first module 93a, a portion of the CWF-based gas retained by gas holder 92 flows in the direction of arrows E and F to first module 93a via conduits 131-133 and a third port of the first module, maintaining the non-liquid volume within the first module at the pre-compressed pressure in anticipation of a subsequent charging cycle.

The first charging cycle is terminated when second module 93b is completely filled with transfer liquid, first module 93a is filled with CWF-based gas at the pre-compressed pressure, and the one or more storage tanks 94a-c are completely filled with CWF-based gas, i.e. no other fluid is received in the one or more storage tanks, at a higher pressure than the pre-compressed initial pressure, after having been compressed by the CWF-based gas transferred thereto from second module 93b. All valves are then closed.

To initiate a second charging cycle, second module liquid discharge valve 101B, first module liquid inlet valve 102A, liquid feed valve 114, first module gas inlet valve 111A, second module gas inlet valve 111B and first module gas transfer valve 117B are opened. First pump 108 is then activated and the transfer liquid is delivered from second module 93b to first module 93a, flowing in the direction of arrow G through conduit 141 extending from a first port of the second module, through conduit 123, and in the direction of arrow H through conduit 144 extending from the end of conduit 123 to a second port of first module 93a. The same process performed in the first charging cycle is repeated in the second charging cycle. Thus when first module 93a is filled with the transfer liquid, the compressed gas is urged to be displaced and to flow across a sixth port thereof, flowing in the direction of arrow I through conduit 147 and of arrow D through conduit 128 and the corresponding conduits 129 to the one or more storage tanks 94a-c. The compressed gas transferred from first module 93a causes the stored CWF-based gas in each of the one or more storage tanks 94a-c to become additionally compressed.

The second charging cycle is terminated when first module 93a is completely filled with transfer liquid, second module 93b is filled with CWF-based gas at the pre-compressed pressure, and the one or more storage tanks 94a-c are completely filled with CWF-based fluid at a higher pressure than the pressure achieved at the end of the first charging cycle, after having been compressed by the CWF-based gas transferred thereto from first module 93a. All valves are then closed.

The charging cycles are likewise able to be repeated, insofar as the first and second modules are alternately filled with transfer liquid and CWF-based gas at the pre-compressed pressure, respectively, at each subsequent charging cycle. By delivering the transfer liquid back and forth between the first and second modules during each subsequent charging cycle and supplementing the volume of the module from which transfer liquid was discharged with CWF-based gas from the gas holder, the two modules are immediately ready for use in a subsequent charging cycle upon termination of the previous charging cycle. The charging process will continue until the CWF-based fluid in the one or more storage tanks 94a-c will be condensed and change phase from gas to liquid. The liquid CWF-based fluid is stored in the one or more storage tanks 94a-c until discharge is required.

During any of the charging cycles, if required, the stored CWF-based fluid is able to undergo a cooling operation, a heating operation or a mixing operation in conjunction with suitable apparatus 122 upon opening isolation valve 119 operatively connected to conduit 126, the latter being in fluid communication with second and third ports of each of the storage tanks 94a-c in parallel to facilitate circulation of the stored CWF-based fluid by a closed loop. Alternatively, conduit 126 is adapted to deliver cooling medium such as water that is able to flow within a cooling coil provided internally to the one or more storage tanks.

FIG. 11 illustrates operation of system 91 during the discharging mode. In pre-discharge conditions, all valves are closed. Also, one module is completely filled with transfer liquid and the other module is completely filled with CWF-based gas at the pre-compressed pressure. With respect to the following exemplary first discharging cycle, first module 93a is completely filled with transfer liquid and second module 93b is completely filled with CWF-based gas at the pre-compressed pressure.

To initiate a first discharging cycle, first module liquid discharge valve 101A, first module gas transfer valve 117A, and turbine injection valve 151 are opened. A predetermined amount of CWF-based fluid, which may be controlled by momentarily opening first module gas transfer valve 117A for a predetermined duration or in response to a sensed value, is released from the one or more storage tanks 94a-c, flowing through conduits 129, 128 and 147 in directions J and K until being introduced within the interior of first module 93a. The released CWF-based fluid forcefully contacts the transfer liquid within first module 93a so that the transfer liquid will become pressurized to the same pressure as the released CWF-based fluid. As a result of the pressure differential between the turbine inlet, whose pressure is substantially equal to that of the pressurized transfer liquid, and the turbine outlet which is exposed to the low-pressure reservoir 98, the transfer liquid is caused to be propelled through conduits 121, 148 and 153 in directions L and M towards hydraulic turbine 96. Conduit 153 with which turbine injection valve 151 is operatively connected extends from the junction between conduits 141 and 148 to reservoir 98. The transfer liquid drives hydraulic turbine 96 to generate electricity which is able to be supplied to the grid. Reservoir 98, which may be in fluid communication with gas holder 92 via interconnecting conduit 143 and is consequently unexposed to the environment, or alternatively is in fluid communication with the surrounding air, receives the transfer liquid discharged from hydraulic turbine 96.

In response to the discharge of high-pressure transfer liquid from first module 93a, additional volume of first module 93a that is unoccupied by the transfer liquid is made available to the CWF-based fluid, which is consequently able to expand and to achieve a two phase vapor-liquid state or a completely gaseous phase. By virtue of the direct contact between the CWF-based fluid and the transfer liquid, a change in temperature of the CWF-based fluid is reduced, allowing the CWF-based fluid to expand substantially isothermally.

Substantially isothermal expansion of the CWF-based fluid within first module 93a, during which the CWF-based fluid undergoes a cooling process, may be ensured by circulating heating transfer liquid located at the bottom of first module 93a by means of second pump 109 in a closed loop across fourth and fifth ports of the first module and through conduits 135, 137 and 139, when isolation valve 116A operatively connected to conduit 135 and isolation valve 118A operatively connected to conduit 139 are opened. Alternatively or additionally, mixing equipment or spray nozzles in use when isolation valves 116A and 118A are opened are able to assist in ensuring substantially isothermal expansion.

Simultaneously to the discharge of high-pressure transfer liquid from first module 93a, second module liquid inlet valve 102B, second module gas outlet valve 113B and return valve 156 are opened. Thus, while the transfer liquid is flowing into reservoir 98, the received transfer liquid is delivered by first pump 108 to second module 93b in anticipation of another discharge cycle, flowing through return conduit 158 and conduits 123 and 124 in directions N and O. In response, CWF-based gas is displaced by the delivered transfer liquid from a seventh port of second module 93b to gas holder 92 through conduits 131 and 149 in directions P and Q. The first discharging cycle is terminated when first module 93a is filled completely with CWF-based gas at a predetermined low pressure and second module 93b is filled completely with transfer liquid at near-atmospheric pressure. All valves are then closed.

To initiate a second discharging cycle, second module liquid discharge valve 101B and turbine injection valve 151 are opened. When second module gas transfer valve 117B is momentarily opened, during a predetermined duration or until a sensed value is detected, a predetermined amount of CWF-based fluid is released from the one or more storage tanks 94a-c, flowing through conduits 127-129, 128 in directions J and R until being introduced within the interior of second module 93b. Once a predetermined amount of CWF-based fluid is introduced into second module 93b, valve 117B is closed. Transfer liquid within second module 93b is consequently caused to be propelled by the released CWF-based fluid through conduits 141 and 153 in directions S and M towards hydraulic turbine 96 to generate electricity which is able to be supplied to the grid.

The same process performed in the first discharging cycle is repeated in the second discharging cycle, but with respect to the other module. Accordingly, the transfer liquid that has flowed into reservoir 98 is returned by first pump 108 to first module 93a in anticipation of another discharge cycle while first module liquid inlet valve 102A, first module gas outlet valve 113A and return valve 156 are opened, flowing through return conduit 158 and conduits 123 and 159 in directions N and T. In response, CWF-based gas is displaced by the delivered transfer liquid from a seventh port of first module 93a to gas holder 92 through conduits 131, 149 and 161 in directions U, P and Q. The second discharging cycle is terminated when second module 93b is filled completely with CWF-based gas at a predetermined low pressure and first module 93a is filled completely with transfer liquid at near-atmospheric pressure. All valves are then closed.

The discharging cycles are likewise able to be repeated, insofar as the first and second modules are alternately filled with transfer liquid and CWF-based gas at a predetermined low pressure, respectively, at each subsequent discharging cycle. By delivering the transfer liquid back and forth between the first and second modules during each subsequent discharging cycle and receiving CWF-based gas within the module from which transfer liquid was discharged from the one or more storage tanks, the two modules are immediately ready for use in a subsequent discharging cycle upon termination of the previous discharging cycle. The discharging process will continue until the pressure of the CWF-based fluid in the one or more storage tanks 94a-c is reduced to the predetermined pre-compressed pressure.

As may be appreciated by the preceding description, reduced costs and increased system-wide round trip efficiency for mechanical energy storage relative to prior art practice are able to be realized with the system of the present invention by using conventional hydraulic equipment, i.e., a hydraulic pump during the charging mode and a hydraulic turbine during the discharging mode. Cost reduction is also made possible by avoiding the need of additional thermal energy storage that is usually required by the prior art to absorb the heat of compression, since the working fluid used in the system of the present invention is advantageously able to undergo substantially isothermal compression.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

What is claimed is:

1. A method for producing power with stored energy, comprising the steps of:
   a) providing a first pressure vessel and a second pressure vessel, wherein said second pressure vessel is capable of being in fluid communication with said first pressure vessel and is set to a temperature no greater than ambient temperatures;
   b) substantially isothermally compressing, within said first pressure vessel, a condensable working fluid (CWF) that is condensable at ambient temperatures during direct contact with an unvaporizable liquid and causing at least a portion of the compressed CWF to be transferred from said first pressure vessel to said second pressure vessel in response to interaction with the unvaporizable liquid;
   c) transferring an additional amount of compressed CWF to said second pressure vessel to cause all or a majority of the CWF within said second pressure vessel to be compressed to its saturation pressure and be condensed to produce liquid CWF;
   d) propelling at least some of the unvaporizable liquid located in said first pressure vessel by the compressed CWF discharged from said second pressure vessel towards at least one hydraulic turbine; and
   e) rotatably driving said at least one hydraulic turbine by the propelled unvaporizable liquid to produce power,
   wherein flow of the unvaporizable liquid to said second pressure vessel is prevented while the at least a portion of the compressed CWF is being transferred from said first pressure vessel to said second pressure vessel.

2. The method according to claim 1, wherein the CWF is substantially isothermally compressed by activating a unit of mixing equipment in fluid communication with the first or second pressure vessel and thereby eliminating temperature gradients within the CWF.

3. The method according to claim 2, wherein the unit of mixing equipment is activated in response to a sensed condition indicative of liquefaction of the CWF.

4. The method according to claim 1, wherein the at least some of the unvaporizable liquid located in said first pressure vessel is propelled by the compressed CWF discharged from said second pressure vessel towards the at least one hydraulic turbine when the discharged compressed CWF is in a liquid state, a gas state or in a multiphase state.

5. The method according to claim 1, wherein the step of causing at least a portion of the compressed CWF to be transferred from said first pressure vessel to said second pressure vessel is performed during a plurality of charging cycles.

6. The method according to claim 5, wherein the step of propelling at least some of the unvaporizable liquid located in said first pressure vessel by the compressed CWF discharged from said second pressure vessel is performed during a plurality of discharging cycles.

7. The method according to claim 6, further comprising the steps of:
   i. providing a third pressure vessel that is capable of being in fluid communication with said first pressure vessel, wherein, prior to performing one of a charging cycle or a discharging cycle, said third pressure vessel is completely filled with a first fluid selected from CWF gas or the unvaporizable liquid and said first pressure vessel is completely filled with a second fluid selected from CWF gas or the unvaporizable liquid which is different than the first fluid; and
   ii. performing the one of a charging cycle or a discharging cycle such that, when terminated, said third pressure vessel is completely filled with the second fluid and said first pressure vessel is completely filled with the first fluid.

8. The method according to claim 7, further comprising performing the other of a charging cycle or a discharging cycle when said third pressure vessel is completely filled with the second fluid and said first pressure vessel is completely filled with the first fluid.

9. The method according to claim 1, wherein the compressed CWF discharged from said second pressure vessel expands substantially isothermally during direct contact with the unvaporizable liquid within the first pressure vessel.

* * * * *